(No Model.)
H. F. PARSHALL.
COMPOUNDING DYNAMO ELECTRIC MACHINE.
No. 509,486. Patented Nov. 28, 1893.
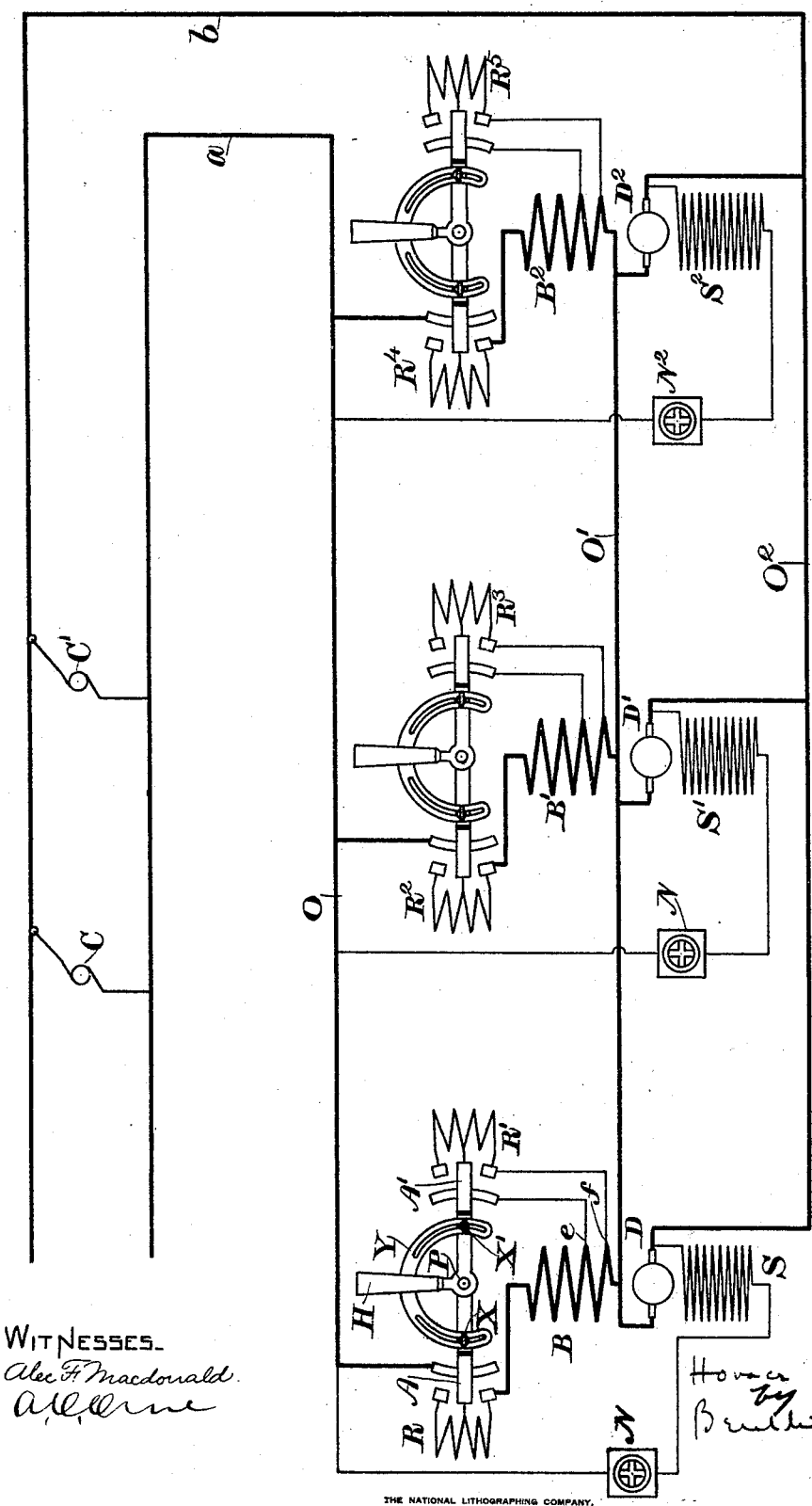
WITNESSES
Alec F. Macdonald
A. C. Orne
INVENTOR
Horace F. Parshall
by Buckley & Blodgett
Attys.

UNITED STATES PATENT OFFICE.

HORACE F. PARSHALL, OF LYNN, ASSIGNOR TO THE GENERAL ELECTRIC COMPANY, OF BOSTON, MASSACHUSETTS.

COMPOUNDING DYNAMO-ELECTRIC MACHINES.

SPECIFICATION forming part of Letters Patent No. 509,486, dated November 28, 1893.

Application filed May 11, 1893. Serial No. 473,787. (No model.)

*To all whom it may concern:*

Be it known that I, HORACE F. PARSHALL, a citizen of the United States, residing at Lynn, in the county of Essex and State of Massachusetts, have invented certain new and useful Improvements in Compounding Dynamo-Electric Machines, of which the following is a specification.

My invention relates to an apparatus for adjusting the current passing through a coil without altering the amount of resistance in circuit; and is particularly applicable to the case of compound dynamo electric machines delivering constant potential currents, and connected in multiple to the same work circuit, especially where such machines have a connection taken from a point between a brush and the series winding of one machine to a similar point in the circuit of each of the other machines, as shown and described in the patent to E. W. Rice, Jr., No. 328,253, dated October 13, 1885. When such an equalizing conductor is used it is difficult, as ordinarily arranged, to adjust the compounding action of one machine without interfering with that of the others; and to overcome this trouble it has been found necessary to make a great number of adjustments in resistance devices for controlling the compounding effect. By my present invention this difficulty is obviated, and any adjustment required for the series coil of one machine of the multiple group is easily made without interfering with the proper compounding of the other machines.

The drawing hereunto annexed and hereby made a part of this specification is a diagrammatic representation of an arrangement embodying my invention; and therein D, D' and D² represent three dynamo electric machines or generators connected in multiple between the omnibus wires O, O², from which lead the external circuit wires $a$, $b$ going to the work, represented here by electric railway motors C and C'. S, S' and S² are the shunt field-magnet coils of the machines D, D', D², respectively, connected in derivation to the brushes on the machines and included in whose circuit may be placed rheostats N, N, N, for regulation. B, B' and B² are the series coils of the machines D, D' and D², conveying the main current to the circuit $a$, $b$. O' is an equalizing conductor, connected in the circuit in the same manner and for the same purpose as in the patent to Rice above referred to.

Regulation of the compounding action has heretofore been obtained by placing a resistance in shunt with the series coil, that is, between the omnibus wire O and the equalizing connection O': and it has also been attempted by placing a resistance in series with the coils B, B', B². A difficulty arises from the fact that the variation of a resistance in shunt around the series coils, as B, of the machine D, or in series with such a coil, will affect the compounding of the other machines D' and D²; because, in the case of machine D, any reduction of resistance through another circuit B' in multiple with its series field circuit B will divert current from circuit B to such other circuit, or conversely more current will flow through the coil B if the resistance of such other multiple circuit has been increased. Thus, should resistance R' in series with the coil B diminish in amount, current would tend to be diverted from coils B' and B² to flow through the coil B by way of the equalizing connection O' and consequently the compounding action of D' and D² would be disturbed. To preserve the balance of the different machines when arranged in multiple, it would be necessary, if a change were made in the resistance R of the machine D, to make compensating changes in the resistance R² of the machine D' and R⁴ of the machine D²: any change in the resistance R² of the machine D' would similarly disturb the compounding of machines D and D'. Thus it will be readily seen that it is a matter of extreme difficulty to get a proper regulation under such conditions. If, however, an adjustment of any of the series coils of the machines, as for instance the coil B of machine D, by operating a resistance in circuit therewith, can be made without changing the total resistance between the omnibus wire O and the equalizing connection O', no such trouble as has been referred to above would be experienced. This I accomplish as follows: A resistance R', R³, R⁵, is placed in shunt around a portion of the series coil of each machine, as shown at R' in the machine on the left-hand side of the drawing, which resistance R' shunts a portion of the series coil at $e, f$. Such resistance R' is used in conjunction with a resistance R, which latter is in series with the coil B, as shown. It is evident that the resistances R and R' may be simultaneously varied, so that while R is increasing in amount R' would be diminishing, or vice versa; and while the total resistance between O and O' remains unchanged, the amount of current flowing through the series coil B would be changed by the diversion of current through R'. The compounding action of the coil B of the machine D may be in this manner increased or diminished without affecting the compounding action of the other machines D' and D². The machines D' and D² would of course be provided with regulating appliances similar to those described.

While the resistances R and R' may be adjusted separately, it is preferred to make their action interdependent and automatic, and any arrangement for accomplishing this will answer the purposes of my invention. Any suitable arrangement, mechanical or electrical, may be employed to obtain this interdependent action, whereby any movement of the rheostat arm operating to change the resistance of R would cause a compensating change in the resistance R', or vice versa, and in such a manner as to maintain the resistance between O and O' practically constant.

In the figure the arms, A A' of the rheostats R and R' are shown adapted to be operated by a single handle H. These arms are independently pivoted at the point P, the arm A' moving with the handle H, while the arm A is disconnected therefrom. A slotted yoke Y is secured to the arms A A' by thumb-screws X X', clamping the arms thereto and cause them to move simultaneously with the operation of the handle H. When the machine D is placed in position in multiple with the other machines, the arms A and A' are independently adjusted to give the proper balance to the resistances R and R' in accordance with the drop of potential in the omnibus wires, and other conditions: the position of compensation being ascertained, the thumb-screws X and X' are tightened, and thereafter any regulation of the current through the series coil B of the machine D will not affect the compounding action of the other machines in multiple therewith, the total resistance between O' and O² remaining unchanged as described.

Any suitable interacting mechanism, electric, hydraulic, or pneumatic, between the arms A, A', may be employed instead of that shown, and all such mere variations I aim to embrace in my claims.

It is manifest that the method herein set out may be applied to the regulation of coils other than those of a dynamo electric machine, where such regulation is desirable.

What I claim as new, and wish to protect by Letters Patent of the United States, is—

1. An apparatus for adjusting the current passing in an electric coil without varying the resistance thereof, which consists of a resistance in series with the coil, a second resistance in shunt to a portion thereof, and means, substantially as described, for simultaneously and inversely varying the two resistances.

2. A compound wound dynamo having a series coil and an adjustable resistance in series therewith, a second adjustable resistance in shunt around a section of the coil, and means adapted to vary the resistances simultaneously and inversely; whereby the resistance between the brush and the line is maintained substantially constant, while the total current passing in the coil may be varied.

3. A plurality of dynamo electric machines having series coils connected in multiple between an omnibus wire and the brushes and an equalizing conductor between them, each machine provided with a resistance in series with the series coil, a second resistance in shunt around a part thereof, and means adapted to vary the resistances simultaneously and inversely; whereby the total resistance in each circuit is constant while its distribution may be altered to vary the current in the coil, thus permitting the adjustment of one machine without disturbing the others.

4. An apparatus for varying the current passing in an electric coil without changing the resistance thereof, which consists of a resistance in series with the coil, a second resistance in shunt to a part thereof, a pair of contact arms adjustable toward or away from each other and connected to a common actuator adapted to move them simultaneously and inversely and thus cut out a part of one resistance and cut in a similar part of the other resistance.

5. An apparatus for varying the current passing in an electric coil without changing the resistance thereof, which consists of a resistance in series with the coil, a second resistance in shunt to a part thereof, a pair of contact arms, as A A', connected to a yoke, as Y, by thumb-screws, as X X', adapted to adjust their relative positions, and actuated by a common handle H, all arranged to cut in or out the two resistances simultaneously and inversely.

6. A compound wound dynamo having a series coil and an adjustable resistance in series therewith, a second adjustable resistance in shunt around the section of the coil, contact arms, as A A', connected to a yoke, as Y, by thumb-screws, as X X', adapted to adjust their relative positions and having a common handle, as H, whereby the two resistances may be cut out or in simultaneously and inversely.

7. A plurality of compound-wound dynamos connected in multiple to omnibus wires and having an equalizing conductor, each dynamo having a series coil and an adjustable resistance in series therewith, a second adjustable resistance in shunt to a section of the coil, contact arms, as A A', connected to a yoke, as Y, by thumb-screws, as X X', adapted to adjust their relative positions and having a common handle, as H, whereby the two resistances may be cut out or in simultaneously and inversely.

In witness whereof I have hereunto set my hand this 8th day of May, 1893.

HORACE F. PARSHALL.

Witnesses:
    JOHN W. GIBBONEY,
    BENJAMIN B. HULL.